US008850128B2

(12) United States Patent
Chu et al.

(10) Patent No.: US 8,850,128 B2
(45) Date of Patent: Sep. 30, 2014

(54) IMPLEMENTING DATA STORAGE AND DUAL PORT, DUAL-ELEMENT STORAGE DEVICE

(75) Inventors: Frank R. Chu, Milpitas, CA (US); Spencer W. Ng, San Jose, CA (US); Motoyasu Tsunoda, Tokyo (JP); Marco Sanvido, Belmont, CA (US)

(73) Assignee: HGST Netherlands B.V., Amsterdam (NL)

( * ) Notice: Subject to any disclaimer, the term of this patent is extended or adjusted under 35 U.S.C. 154(b) by 722 days.

(21) Appl. No.: 12/646,726

(22) Filed: Dec. 23, 2009

(65) Prior Publication Data

US 2011/0153959 A1    Jun. 23, 2011

(51) Int. Cl.
*G06F 12/10* (2006.01)
*G06F 3/06* (2006.01)

(52) U.S. Cl.
CPC ............ *G06F 3/0658* (2013.01); *G06F 3/0626* (2013.01); *G06F 3/0635* (2013.01); *G06F 3/068* (2013.01)
USPC ..... 711/149; 711/112; 711/103; 711/E12.033

(58) Field of Classification Search
CPC ... G06F 3/0629; G06F 3/0658; G06F 3/0635; G06F 3/068
USPC .................. 711/103, 149, 118, E12.001, 112, 711/E12.033
See application file for complete search history.

(56) References Cited

U.S. PATENT DOCUMENTS

| 6,598,106 | B1 | 7/2003 | Grieshaber et al. | |
|---|---|---|---|---|
| 2007/0136523 | A1* | 6/2007 | Bonella et al. | 711/113 |
| 2008/0172520 | A1* | 7/2008 | Lee | 711/103 |
| 2008/0215800 | A1* | 9/2008 | Lee et al. | 711/103 |
| 2009/0300272 | A1* | 12/2009 | Lin | 711/103 |
| 2009/0307418 | A1* | 12/2009 | Chen et al. | 711/105 |
| 2010/0042773 | A1* | 2/2010 | Yeh | 711/103 |
| 2010/0122016 | A1* | 5/2010 | Marotta et al. | 711/103 |
| 2010/0250834 | A1* | 9/2010 | Trika et al. | 711/103 |
| 2010/0262755 | A1* | 10/2010 | Becker et al. | 711/103 |
| 2011/0066899 | A1* | 3/2011 | Kang et al. | 711/103 |

OTHER PUBLICATIONS

"Serial Storage Wire Archive", http://serialstoragewire.net/Articles/2007_07/developer24.html, 3 pages.

* cited by examiner

*Primary Examiner* — Pierre-Michel Bataille
(74) *Attorney, Agent, or Firm* — Joan Pennington

(57) ABSTRACT

A method for implementing data storage and a dual port, dual element storage device are provided. A storage device includes a predefined form factor including a first port and a second port, and a first storage element and a second storage element. A controller coupled between the first port and second port, and the first storage element and second storage element controls access and provides two separate data paths to the first storage element and second storage element.

26 Claims, 6 Drawing Sheets

IMPLEMENTING DATA STORAGE AND DUAL PORT, DUAL-ELEMENT STORAGE DEVICE

FIELD OF THE INVENTION

The present invention relates generally to the data storage field, and more particularly, relates to a method for implementing data storage and a dual port, dual element storage device.

DESCRIPTION OF THE RELATED ART

Known disk drive systems include a variety of arrangements, for example, Serial Attached SCSI (SAS) and Serial ATA (SATA) drives. Some dual-port SAS enclosures provide support for a SAS drive, or a single SATA drive. Some dual-port enclosures provide capacity to connect to two different hosts, and if one host fails then the other host can access the enclosed hard disk drive.

Some hybrid hard disk drives include flash memory and standard hard disk media storage with the flash memory optimized for quick access. A single-level cell (SLC) stores a single bit of data in each cell, and a multi-level cell (MLC) is capable of storing more than a single bit of information. The SLC flash memory provides faster write speed, lower power consumption, and higher cell endurance. The MLC NAND flash memory provides lower manufacturing costs per megabyte of storage while having a higher bit error ratio.

U.S. Pat. No. 6,598,106 discloses a dual-port enclosure that can contain multiple hard disk drives with the respective dual input ports connected to two separate hosts, or a single host connected to one of the input ports.

A need exists for an improved method and a dual-port integrated storage device (ISD) that enables effectively and efficiently implementing data storage.

SUMMARY OF THE INVENTION

Aspects of the present invention are to provide a method for implementing data storage and a dual port, dual element storage device. Other important aspects of the present invention are to provide such method and dual port, dual element storage device substantially without negative effect and that overcome some of the disadvantages of prior art arrangements.

In brief, a method for implementing data storage and a dual port, dual element storage device are provided. The storage device includes a predefined form factor including a first port and a second port, and a first storage element and a second storage element. A controller coupled between the first port and second port and the first storage element and second storage element providing two separate data paths controls access to the first storage element and second storage element.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

Figure 1:
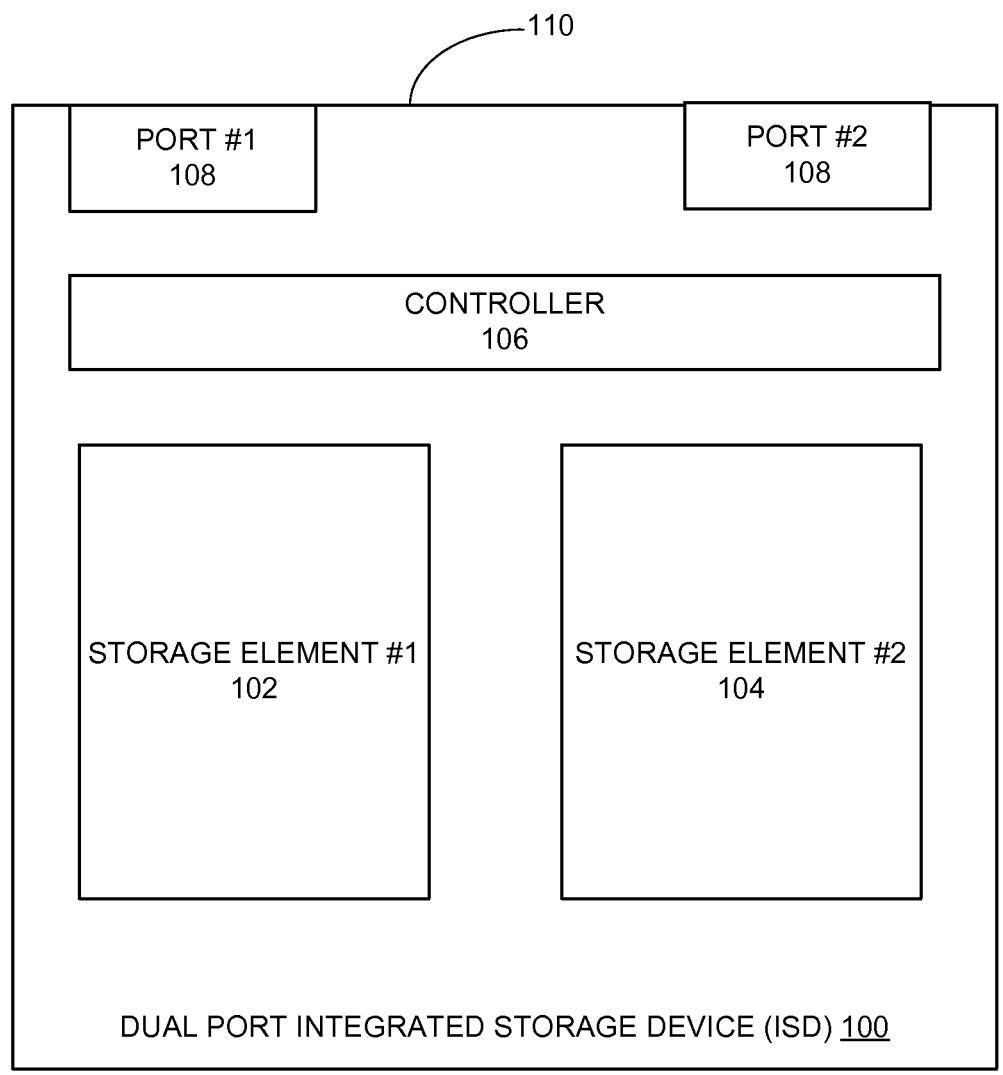
FIG. 1 is a block diagram representation of a dual port, dual element storage device for implementing data storage in accordance with an embodiment of the invention.

Having reference now to the drawings, in FIG. 1, there is shown a dual port integrated storage device or dual port, dual element storage device generally designated by the reference character 100 in accordance with an embodiment of the invention. The dual port, dual element storage device 100 or dual port integrated storage device (ISD) 100 includes a first storage element 102, #1 and a second storage element 104, #2, a controller 106, and a first port 108, #1 and a second port 108, #2. The controller 106 is coupled between the first port 108, #1 and second port 108, #2, and the first storage element 102, #1 and the second storage element 104, #2, and provides two separate data paths and controls access to the first storage element 102, #1 and the second storage element 104, #2.

The dual port, dual element storage device 100 includes a predefined form factor generally designated by the reference character 110 containing the first storage element 102, #1, the second storage element 104, #2, the controller 106, the first port 108, #1 and the second port 108, #2. A host controller (not shown in FIG. 1) sees two storage devices, the first storage element 102, #1 and the second storage element 104, #2 within the dual port ISD 100.

The dual port integrated storage device (ISD) 100 is shown in simplified form sufficient for understanding the present invention. The controller 106 can be fabricated on one or multiple integrated circuit dies, and is suitably programmed to implement storage methods in accordance with embodiments of the invention.

The first storage element 102, #1 and the second storage element 104, #2 include a selected one of multiple predefined storage block combinations. For example, the first storage element 102, #1 and the second storage element 104, #2 include a flash memory and a hard disk drive (HDD) contained within the predefined form factor 110.

Another combination of the first storage element 102, #1 and the second storage element 104, #2 contained within the predefined form factor 110, for example, includes a single-level cell (SLC) solid state drive (SSD), and a multi-level cell (MLC) SSD. Other combinations of the first storage element 102, #1 and the second storage element 104, #2 contained within the predefined form factor 110, for example, include a SLC SSD and a hard disk drive (HDD); and a MLC (2 bits) SSD and a MLC (3 bits) SSD.

Another combination of the first storage element 102, #1 and the second storage element 104, #2 contained within the predefined form factor 110, for example, includes two smaller form-factor hard disk drives (HDDs) contained within a larger form factor HDD, such as two 2.5" HDDs inside a 3.5" HDD form factor, or two 1.8" HDDs inside a 2.5" HDD form factor.

It should be understood that various other combinations of the first storage element 102, #1 and the second storage element 104, #2 also are used in accordance with the invention.

While the single predefined form factor 110 is maintained, the dual first port 108, #1 and second port 108, #2, provide double the typical storage interface port arrangement for a single form factor. Each storage interface defined by the first port 108, #1 and second port 108, #2 can operate at a predefined high speed, such as 6 Gbps speed or higher interface speed.

A standard dual-port Serial Attached SCSI (SAS) input/output (I/O) connector can provide the first port 108, #1 and second port 108, #2. Two standard SAS non-duplex SAS I/O connectors can provide the first port 108, #1 and second port 108, #2. Two Serial ATA (SATA) I/O connectors and a standard dual-port SAS I/O connector as two Serial ATA (SATA) I/O connectors can provide the first port 108, #1 and second port 108, #2. The predefined form factor 110 is a single standard form-factor, such as a single predefined HDD form-factor, or a single predefined SSD form-factor.

Figure 2:
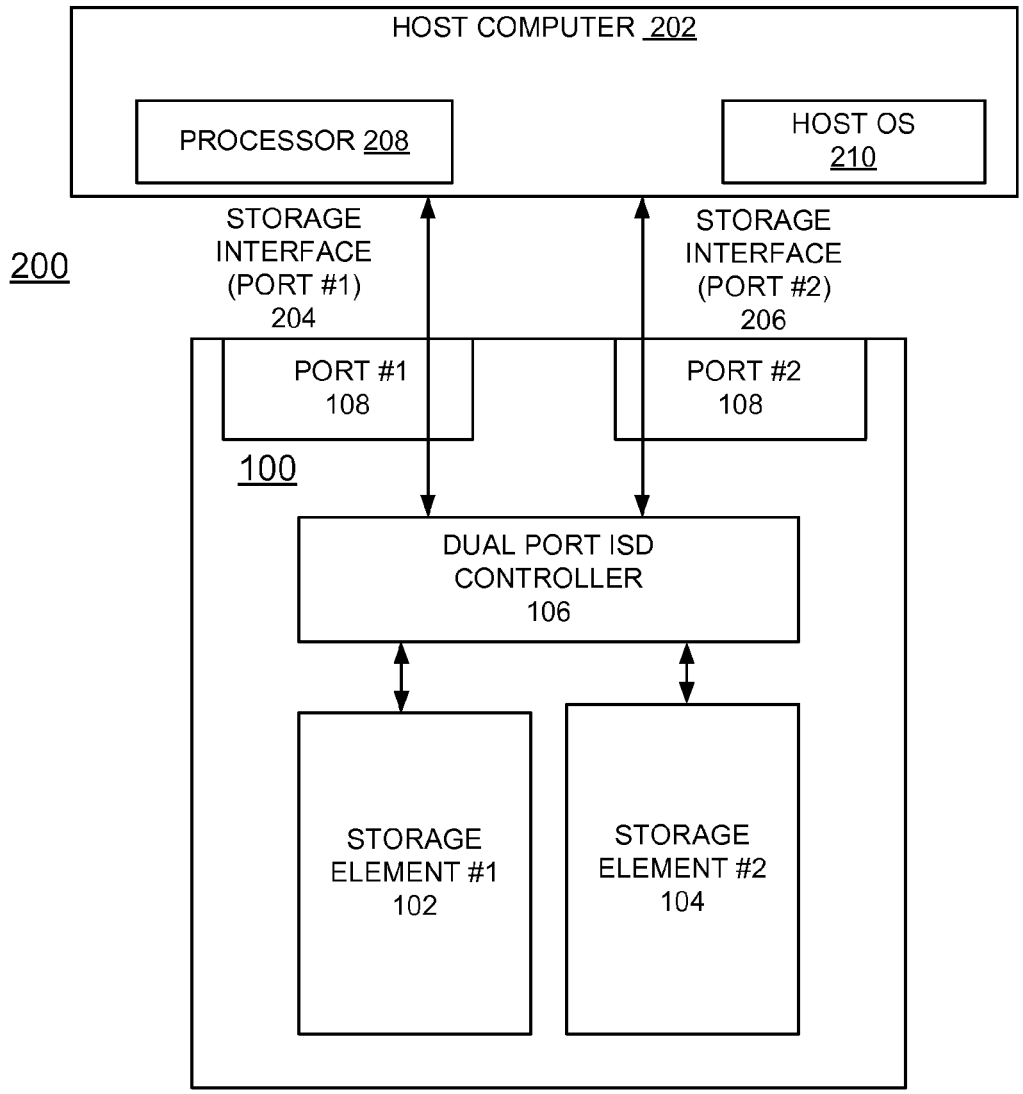
FIGS. 2, 3, 4, and 5 are block diagrams illustrating systems including the dual port, dual element storage device of FIG. 1 in accordance with embodiments of the invention.

Referring also to FIG. 2, there is shown an example system generally designated by the reference character 200 including a host computer 202 and the dual port, dual element or dual port integrated storage device (ISD) 100 in accordance with an embodiment of the invention. System 200 includes a first storage interface 204 coupled via port 108, #1 and a second storage interface 206 coupled via port 108, #2 to the dual port integrated storage device (ISD) controller 106. Host computer 202 includes a processor 208 and a host operating system (OS) 210. Host computer 202 sees two separate storage devices, the first storage element 102, #1 and the second storage element 104, #2 in the dual port ISD 100.

In operation, the host operating system 210 of the host computer 202 sends commands via two separate data paths to the first storage element 102, #1 and the second storage element 104, #2 via the ISD controller 106. In response to the commands, the ISD controller 106 respectively accesses the requested first storage element 102, #1 and the second storage element 104, #2 and performs requested functions such as writing data, reading data, erasing data, and the like.

Optimal storage element configurations to meet host I/O access demand include combination of a SLC SSD and a hard disk drive (HDD) implementing the first storage element 102, #1 and the second storage element 104, #2. The SLC SSD storage element 102, #1 provides faster random data access. The rotating media HDD storage element 104, #2 provides an optimal storage element configuration for sequential operations of large data as well as infrequently used data and backup.

Also the host computer 202 can use a flash storage element 102, #1, for example, for storing frequently accessed random data, such as paging, OS, application program interfaces (APIs), and the like.

The host OS 210 optionally includes a migrate function, which checks for inactive files in the flash storage element 102, #1 and migrates the inactive files to the rotating media HDD storage element 104, #2. The migrate function further checks for active data or frequently used data in the rotating media HDD storage element 104, #2, and migrates the active data to the flash storage element 102, #1.

The dual port ISD controller 106 can also be implemented with a bi-directional migrate function, which checks for inactive files in the flash storage element 102, #1 and migrates the inactive files to the rotating media HDD storage element 104, #2. The migrate function further checks for active data in the rotating media HDD storage element 104, #2, and migrates the active data to the flash storage element 102, #1.

The capacity of the rotating media HDD storage element 104, #2 is always be much greater than the memory capacity of the flash storage element 102, #1, thus another feature of the dual port ISD 100 is to make the HDD storage element contain a backup copy of the entire flash memory image. The dual port ISD controller 106 can implement a migrate copy function, which copies the entire image of the flash storage element 102, #1 onto the rotating media HDD storage element 104, #2.

Either a MLC SSD or a MLC flash memory will always have a much bigger capacity than SLC SSD and SLC flash memory. With a storage element configuration of a MLC SSD or MLC flash memory storage element 104, #2, and a SLC flash memory storage element 102, #1, the MLC storage element 104, #2 is used for similar functions as HDD storage element 104, #2 with the flash storage element 102, #1. Both the migrate and migrate copy functions are implemented with MLC SSD or MLC flash memory storage element 104, #2 and the SLC SSD storage element 102, #1 or the SLC flash memory storage element 102, #1.

The dual port ISD controller 106 can be implemented with a simultaneous access function, for host access of read data that are been duplicated on both flash storage element 102, #1 and rotating media HDD storage element 104, #2. The dual port ISD controller 106 can simultaneously access from the both storage elements, the earliest read data got fetched from the storage element will be sent to the host.

In operation, the host operating system 210 of the host computer 202 optionally uses the single HDD-form factor controller 106 and two HDD storage elements 102, #1 and 104, #2 implementing a redundant array of independent disks (RAID) function, such as a RAID-0 or RAID-1 device 100. This type of RAID function can also be applicable with two SSD storage elements 102, #1 and 104, #2.

Figure 3:
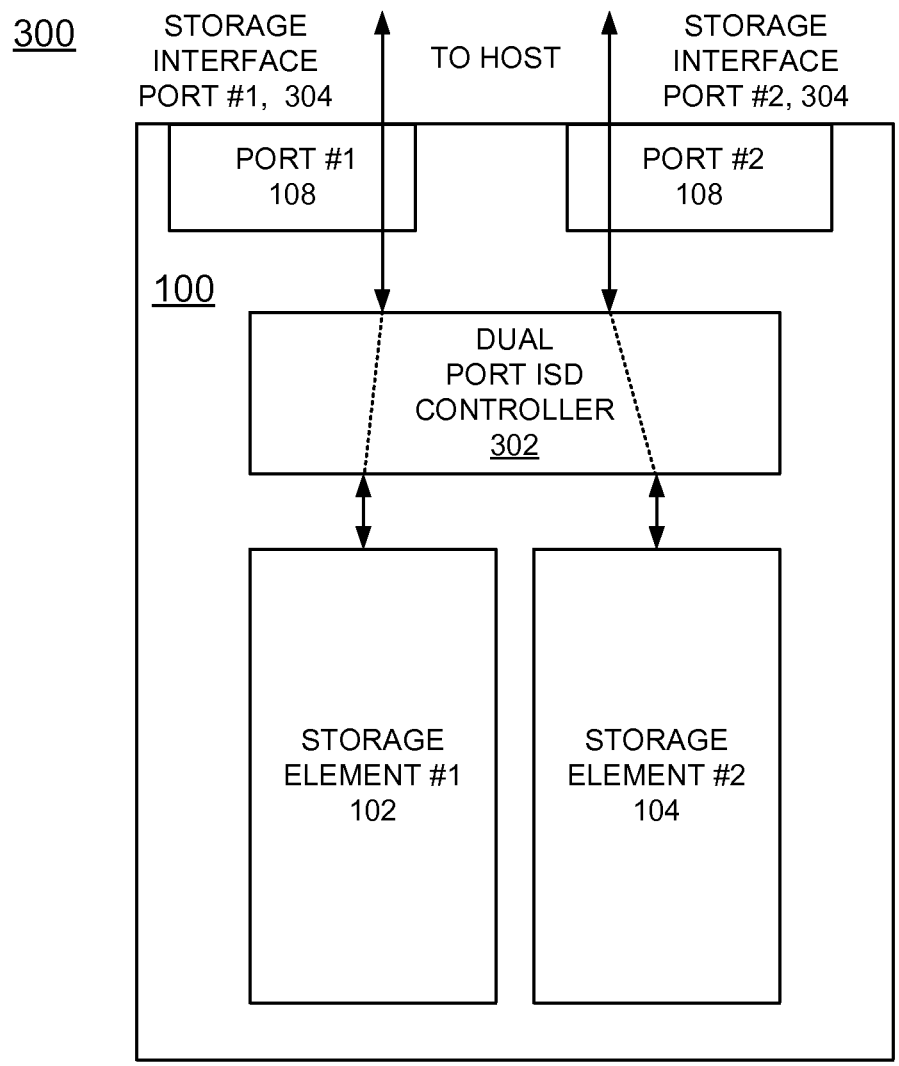

Referring also to FIG. 3, there is shown an example system generally designated by the reference character 300 in accordance with an embodiment of the invention. In system 300, each port is dedicated to one storage element. The dual port, dual element or dual port integrated storage device (ISD) 100 of system 300 includes a dual port ISD controller 302 that configures a dedicated path from a storage interface port #1, 304 to the storage element #1, 102 and a dedicated path from a storage interface port #2, 304 to the storage element #2, 104.

Figure 4:
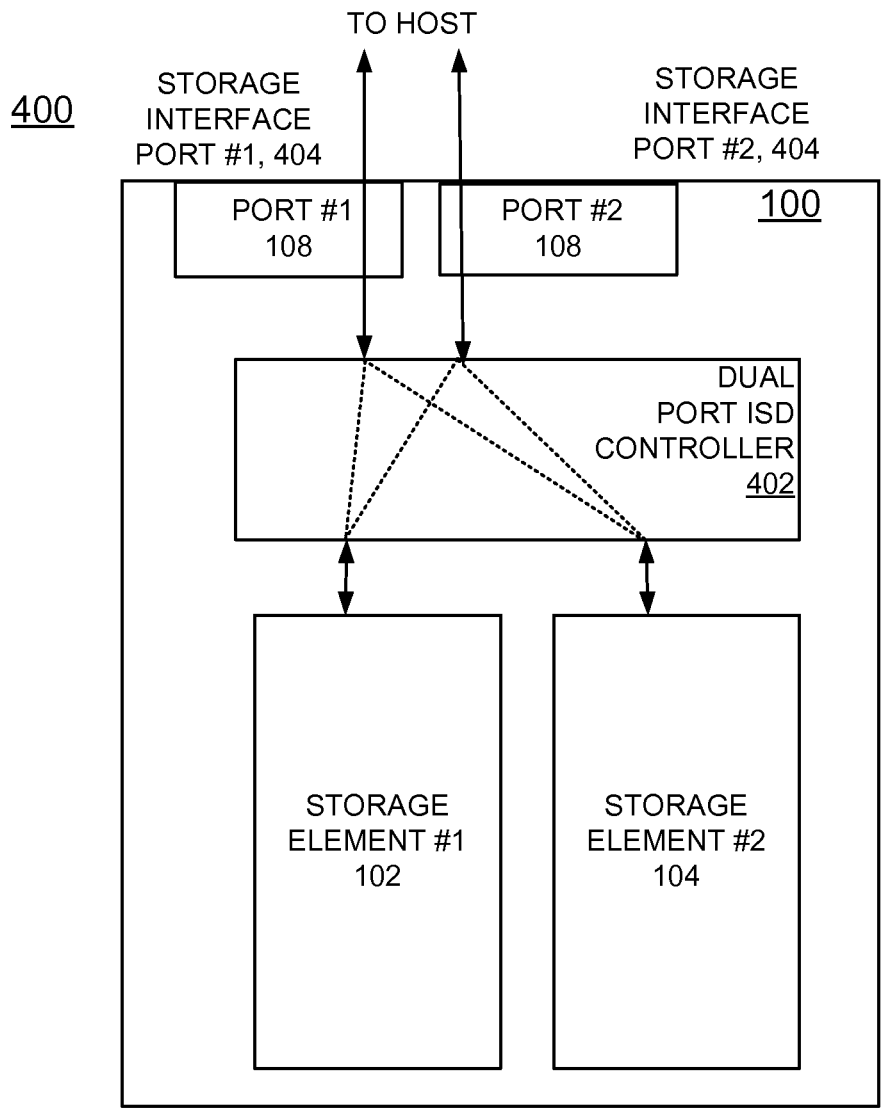

Referring also to FIG. 4, there is shown an example system generally designated by the reference character 400 in accordance with an embodiment of the invention. In system 400, each port can communicate with either storage element. The dual port, dual element or dual port integrated storage device (ISD) 100 of system 400 includes a dual port ISD controller 402 that configures a dynamic switchable path from a storage interface port #1, 404 to the storage element #1, 102 and to the storage element #2, 104 and a dynamic switchable path from a storage interface port #2, 404 to the storage element #1, 102 and the storage element #2, 104. With the dynamic switchable path configuration of system 400 if one port #1, 404 or port #2, 404 fails, the other port still maintains access to both storage elements #1, 102, and #2, 104.

With system 400 including the dynamic switchable path port feature, if one storage interface port is broken, for example, the storage interface port #1 402, then the other storage interface port, the storage interface port #2, 402 is used as the access port for both the storage element #1, 102 and the storage element #2, 104.

Figure 5:
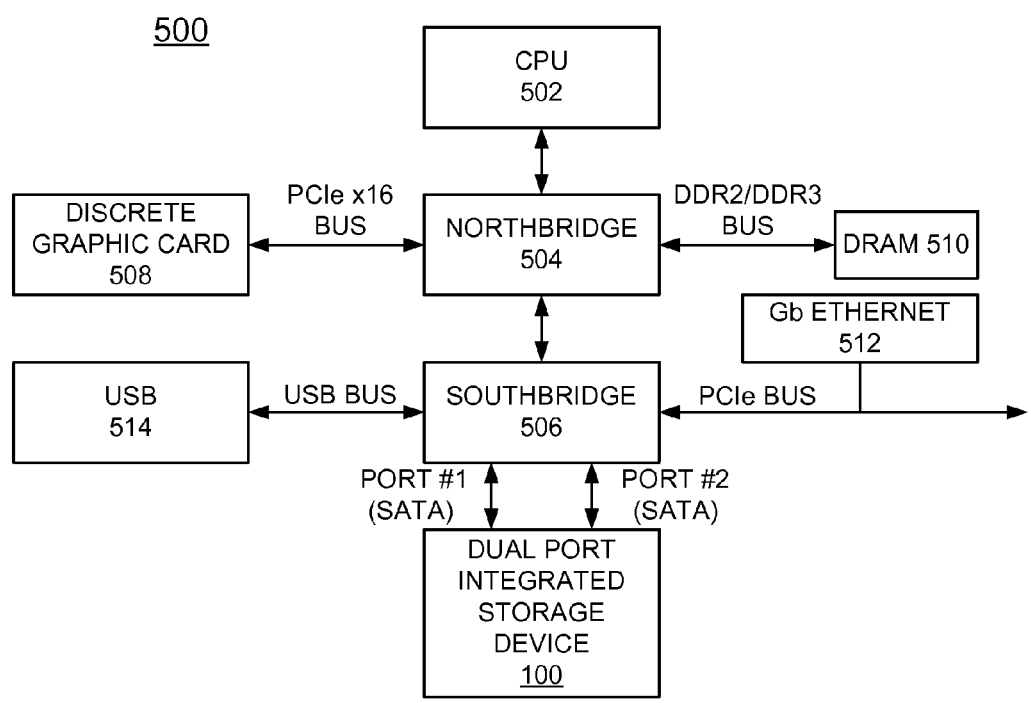

Referring also to FIG. 5, there is shown an example computer system generally designated by the reference character 500 including the dual port, dual element or dual port integrated storage device (ISD) 100 in accordance with an embodiment of the invention. Computer system 500 includes a processor or central processor unit (CPU) 502, a northbridge 504 or a first memory controller 504 and a southbridge 506 or an I/O controller 506. The northbridge is coupled to and handles communications between the CPU 502, a PCI express (PCIe) discrete graphics card 508, a double data rate (DDR) DDR2 or DDR3 dynamic random access memory (DRAM) 510, and the southbridge 506. The southbridge 506 is coupled to and handles communications between the northbridge 504, a PCIe Ethernet 512, a universal serial bus (USB) device 514, and the dual port IDE 100 including the dual port ISD controller 106 via a port #1, (SATA) and a port #2, (SATA).

Figure 6:
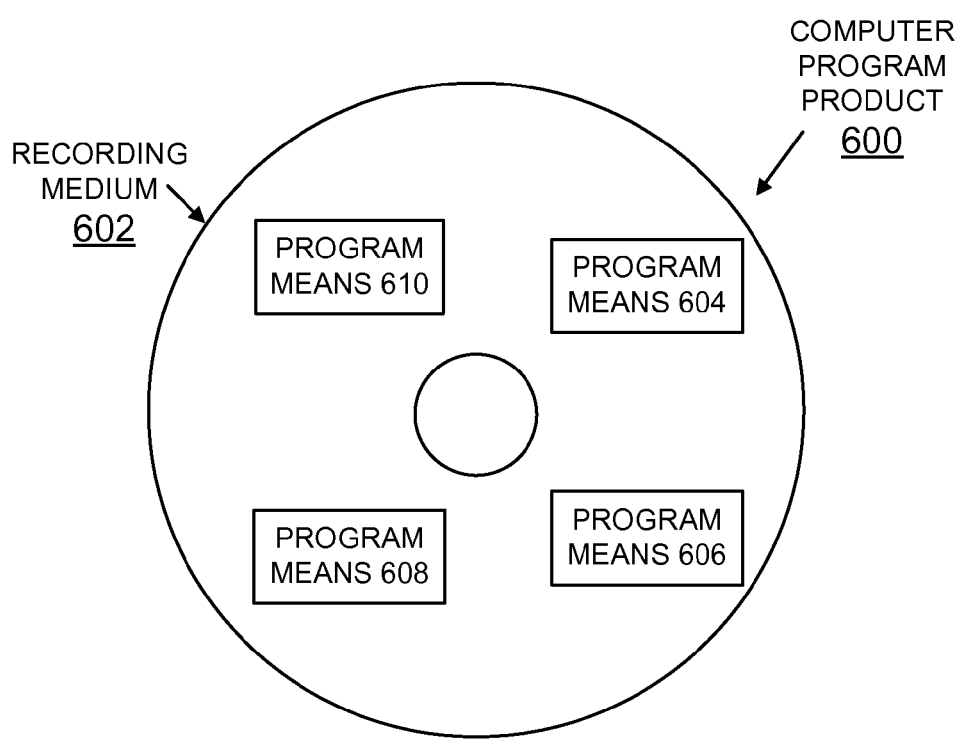
FIG. 6 is a block diagram illustrating a computer program product in accordance with embodiments of the invention.

Referring now to FIG. 6, an article of manufacture or a computer program product 600 of the invention is illustrated. The computer program product 600 includes a computer readable recording medium 602, such as, a floppy disk, a high capacity read only memory in the form of an optically read compact disk or CD-ROM, a tape, or another similar computer program product. Computer readable recording medium 602 stores program means or control code 604, 606, 608, 610 on the medium 602 for carrying out the methods for storing data of the embodiments of the invention in the dual port, dual element storage device 100 of FIG. 1.

A sequence of program instructions or a logical assembly of one or more interrelated modules defined by the recorded program means or control code 604, 606, 608, 610, direct the dual port, dual element storage device 100 for storing data in accordance with the embodiments of the invention.

While the present invention has been described with reference to the details of the embodiments of the invention shown in the drawing, these details are not intended to limit the scope of the invention as claimed in the appended claims.

What is claimed is:

1. A dual port, dual element storage device comprising:
a predefined form factor, said predefined form factor including a single predefined form factor containing the dual port, dual element storage device, said single predefined form factor including a first storage interface port and a second storage interface port, each of said first storage interface port and said second storage interface port including an input/output (I/O) connector connected to a host computer;
a first storage element and a second storage element;
a controller coupled between said first storage interface port and said second storage interface port, and said first storage element and said second storage element,
said host computer sending respective commands to said first storage element and said second storage element via two separate data paths respectively including said first storage interface port and said second storage interface port;
said controller providing said two separate data paths, controls access to said first storage element and said second storage element responsive to commands from said host computer; and
said single predefined form factor containing said first storage element, said second storage element, said controller, said first storage interface port and said second storage interface port.

2. The dual port, dual element storage device as recited in claim 1 wherein said first storage element and said second storage element include a flash memory, and a hard disk drive (HDD).

3. The dual port, dual element storage device as recited in claim 1 wherein said first storage element and said second storage element include a single-level cell (SLC) solid state drive (SSD), and a multi-level cell (MLC) SSD.

4. The dual port, dual element storage device as recited in claim 1 wherein said first storage element and said second storage element include a pair of hard disk drives (HDDs).

5. The dual port, dual element storage device as recited in claim 1 wherein said first storage element and said second storage element include a solid state drive (SSD) and a hard disk drive (HDD).

6. The dual port, dual element storage device as recited in claim 1 wherein said first storage element and said second storage element include a pair of multi-level cell (MLC) SSD solid state drives (SSDs).

7. The dual port, dual element storage device as recited in claim 1 wherein said first storage interface port and said second storage interface port include a dual-port Serial Attached SCSI (SAS) input/output (I/O) connector.

8. The dual port, dual element storage device as recited in claim 1 wherein said first storage interface port and said second storage interface port include a pair of non-duplex Serial Attached SCSI (SAS) I/O connectors.

9. The dual port, dual element storage device as recited in claim 1 wherein said first storage interface port and said second storage interface port include a pair of Serial ATA (SATA) I/O connectors.

10. The dual port, dual element storage device as recited in claim 1 wherein said first storage interface port and said second storage interface port include a dual-port Serial Attached SCSI (SAS) input/output (I/O) connector arranged as a pair of Serial ATA (SATA) I/O connectors.

11. The dual port, dual element storage device as recited in claim 1 wherein said predefined form factor includes a single predefined hard disk drive (HDD) form-factor.

12. The dual port, dual element storage device as recited in claim 1 wherein said predefined form factor includes a single predefined SSD form-factor.

13. The dual port, dual element storage device as recited in claim 1 includes said controller providing a respective dedicated data path between said first storage interface port and said first storage element, and between said second storage interface port and said second storage element.

14. The dual port, dual element storage device as recited in claim 1 includes said controller providing a respective dynamic switchable data path between said first storage interface port and said first storage element and said second storage element, and between said second storage interface port and said first storage element and said second storage element.

15. An apparatus for implementing data storage comprising:
a predefined form factor, said predefined form factor including a single predefined form factor containing a dual port, dual element storage device, said single predefined form factor including a first storage interface port and a second storage interface port, said first storage interface port and said second storage interface port contained within said single predefined form factor; each of said first storage interface port and said second storage interface port including an input/output (I/O) connector connected to a host computer;
a first storage element and a second storage element contained within said single predefined form factor;
a controller contained within said single predefined form factor; said controller coupled between said first storage interface port and said second storage interface port, and said first storage element and said second storage element,
said host computer sending respective commands to said first storage element and said second storage element via two separate data paths respectively including said first storage interface port and said second storage interface port; and said controller providing said two separate data paths and controlling access to said first storage element and said second storage element responsive to commands from said host computer.

16. The apparatus for implementing data storage as recited in claim 15 wherein said controller uses said control code for selectively configuring a dynamic switchable data path between said first storage interface port and said first storage element and said second storage element, and between said second storage interface port and said first storage element and said second storage element.

17. A method for implementing data storage in a dual port, dual element storage device comprising:

providing a predefined form factor, said predefined form factor including a single predefined form factor containing the dual port, dual element storage device, said predefined form factor including a first storage interface port and a second storage interface port, each of said first storage interface port and said second storage interface port including an input/output (I/O) connector connected to a host computer;

providing a first storage element and a second storage element within said single predefined form factor;

providing a controller coupled between said first storage interface port and said second storage interface port, and said first storage element and said second storage element, said host computer sending respective commands to said first storage element and said second storage element via two separate data paths respectively including said first storage interface port and said second storage interface port;

configuring said controller to provide said two separate data paths and to control access to said first storage element and said second storage element responsive to commands from said host computer; and containing each of said first storage element, said second storage element, said controller, said first storage interface port and said second storage interface port within said single predefined form factor.

18. The method for implementing data storage as recited in claim 17 wherein providing a first storage element and a second storage element within said predefined form factor includes providing a flash memory, and a hard disk drive (HDD), storing selected random data within said flash memory, and storing sequential operations of data blocks within said hard disk drive (HDD).

19. The method for implementing data storage as recited in claim 17 wherein providing a first storage element and a second storage element within said predefined form factor includes providing a pair of hard disk drives (HDDs), and implementing a redundant array of independent disks (RAID) function with said pair of hard disk drives (HDDs).

20. The method for implementing data storage as recited in claim 17 wherein providing a first storage element and a second storage element within said predefined form factor includes providing a pair of solid state drives (SSDs), and implementing a redundant array of independent disks (RAID) function with said pair of solid state drives (SSDs).

21. The method for implementing data storage as recited in claim 17 wherein configuring said controller to provide two separate data paths includes providing a respective dedicated data path between said first storage interface port and said first storage element, and between said second storage interface port and said second storage element.

22. The method for implementing data storage as recited in claim 17 wherein configuring said controller to provide two separate data paths includes providing a respective dynamic switchable data path between said first storage interface port and said first storage element and said second storage element, and between said second storage interface port and said first storage element and said second storage element.

23. The method for implementing data storage as recited in claim 17 wherein providing a first storage element and a second storage element within said predefined form factor includes providing a flash memory, and a hard disk drive (HDD), and said controller implementing a migrate function, and transfers active data to said flash memory from said hard disk drive (HDD).

24. The method for implementing data storage as recited in claim 17 wherein providing a first storage element and a second storage element within said predefined form factor includes providing a flash memory, and a hard disk drive (HDD), and said controller implementing a copy migrate function, and copies a data image of said flash memory onto said hard disk drive (HDD).

25. The method for implementing data storage as recited in claim 17 wherein providing a first storage element and a second storage element within said predefined form factor includes providing a flash memory, and a second larger capacity flash memory, and said controller implementing a migrate function, and transfers active data to said flash memory from said second larger capacity flash memory.

26. The method for implementing data storage as recited in claim 17 wherein providing a first storage element and a second storage element within said predefined form factor includes providing a flash memory, and a second larger capacity flash memory, and said controller implementing a copy migrate function, and copies a data image of said flash memory onto said second larger capacity flash memory.

* * * * *